Aug. 6, 1935.  W. E. McINTIRE  2,010,312

GEARING FOR ENSILAGE DISTRIBUTORS

Filed Aug. 31, 1932  2 Sheets-Sheet 1

INVENTOR
WILLIAM E. McINTIRE
BY Thomas L. Ryan
ATTORNEY.

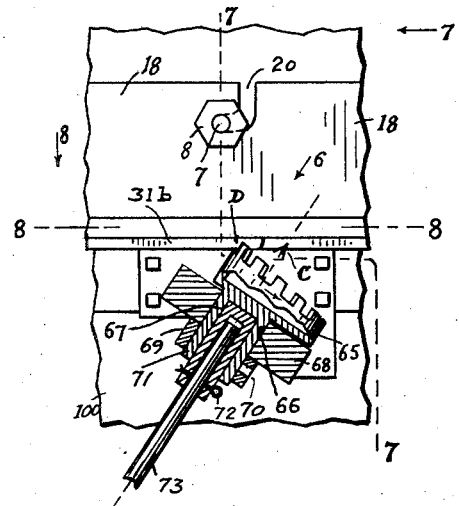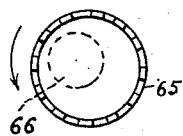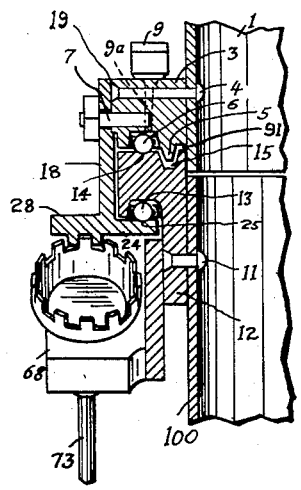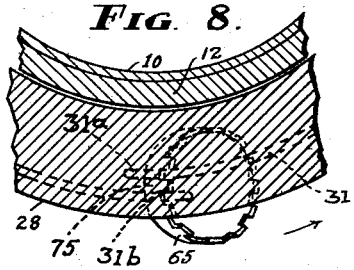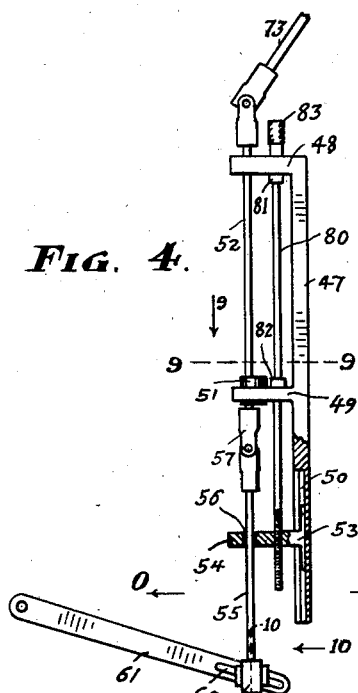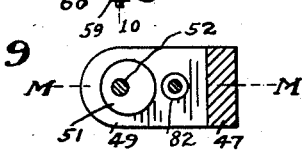

Patented Aug. 6, 1935

2,010,312

UNITED STATES PATENT OFFICE 2,010,312

GEARING FOR ENSILAGE DISTRIBUTORS

William E. McIntire, Montpelier, Ind.

Application August 31, 1932, Serial No. 631,214

8 Claims. (Cl. 74—437)

This invention relates to improvements in gearing intended for spreader devices which are operable in connection with the conduits through which fodder and like products are passed.

In ensiling processes, wherein the fodder is forced by air blast through an upright pipe and its return bend, and thence into the silo, an advantage to be desired is that the fodder which is being passed into the silo may be distributed equably and uniformly. Further advantages sought for are that a mechanism for the purpose of such distribution may be economical of construction, strong and durable, simple to use, not liable to get out of order or repair, and which may be easily installed.

The foregoing general advantages, together with other and more specific benefits which will become apparent as the specification of my invention proceeds, are accomplished by, and the invention is embodied in the new construction, combination, and arrangement of parts described in the following specification and illustrated in the accompanying drawings.

Figure 4 is a detached enlarged view of the mechanism for operating the deflector, the said mechanism being carried by the rotatable chute, as shown in Figure 1.

Figure 5 is an enlarged front view of a portion of the support neck, and a portion of the top section of the chute, the gearing for providing the peculiar motion intended to be transmitted to the deflector operating mechanism, being shown in cross section.

Figure 6 is a top plan view of the crown gear wheel 65, as seen in the direction of arrow 6 in Figure 5.

Figure 7 is a vertical cross sectional view taken on the line 7—7, in the direction of arrow 7 in Figure 5.

Figure 8 is a top plan sectional view taken on the line 8—8, as seen in the direction of arrow 8 in Figure 5.

Figure 9 is an enlarged horizontal sectional view taken on the line 9—9, in the direction of arrow 9 in Figure 4.

Figure 10 is an enlarged vertical sectional view taken on the line 10—10, in the direction of arrow 10 in Figure 4.

Whereas in my application, Serial No. 496,128, filed November 17, 1930, for patent on improvements in fodder spreaders, I have illustrated and described a spreader embodying a revolving tortuous tubular chute at whose mouth is retained a deflector device, and by the use of which said invention there is an improvement in the scattering or distributing of the fodder as it passes from the mouth of the chute, the results are not entirely satisfactory.

In the present invention I have embodied devices carried by, and which are operable by the revolving chute, whereby the deflecting of the fodder passing from the chute, is controlled. By the improved control, the fodder in its straight line of travel, as it reaches the discharge mouth of the chute, is not only deflected during a given time, in a direction varying in incline from the longitudinal axis of the mouth of the chute, and during a given time in an opposite direction varying in incline from the longitudinal axis of the mouth of the chute, but the length of time of the deflecting in one direction is differentiated from the length of time of the deflecting in the other direction.

This deflecting being had with regard to the diameter of the silo, the spread of the fodder over the area bounded by the silo walls, is uniform and is in a practically horizontal plane. The advantage of a spreading, as obtained by my invention, is that the mass is uniform in composition, and possibility of air pockets is avoided.

Figure 11:
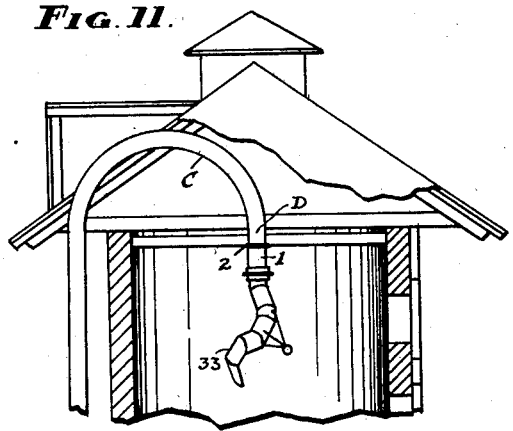
Figure 11 is a view illustrating the top portion of a silo structure, and in which is shown the common arrangement of a conduit pipe of standard formation; and in connection with which said conduit pipe my invention is shown.

My invention, in the embodiment as shown herein, is arranged directly in connection with a conduit pipe of the common type shown in Figure 11, and through which said conduit pipe the fodder is passed by the force of a usual air blast.

In the practicable construction, combination and arrangement of parts shown herein, for carrying my invention into effect, the support neck consists of a stout sheet metal cylinder 1 which is about seven inches in diameter. At its upper edge is provided a connection flange 2, and at its lower portion, a cast metal ring 3 is secured by rivets 4. On the underside of said ring 3 is an annular tongue 5 which is of V shaped formation in cross section. Also there is provided on the underside of said ring 3 an annular anti-friction bearing having the balls 6. Projecting from the sides of said ring are spaced threaded studs 7, each being provided with a nut 8. Semi-solid grease retained in grease cup 9, and which is fed through channel 9a affords lubrication for the bearings.

The tubular chute consists of cylindrical sheet metal sections 100, 110, 120, 130 and 140, united at such angles of inclination that a conduit of the tortuous formation, substantially as shown in the drawings, is considered.

Secured to the upper portion of section 100 by rivets 11, is a cast metal ring 12 which is provided on its underside with an anti-friction bearing having the balls 13. On its top side is a shallow annular raceway 14. Between the said raceway 14 and the inner edge of the ring is an annular groove 15 which is V shaped in cross section.

Associated with the said ring 12, and adapted to be fastened to ring 3 of the support neck 1, is an annular neck band 18 whose upper portion has a suitable counterbore 19 of diameter to engage the face of ring 3. Each of a number of slots 20 has a vertical portion, and a lower portion which extends therefrom at a slight decline. The said slots 20 are spaced to register with the studs 7 of ring 3. The said band 18 has an inturned flange 24 which is provided on its top side with an annular raceway 25 which registers with the above named balls 13.

Figure 1:
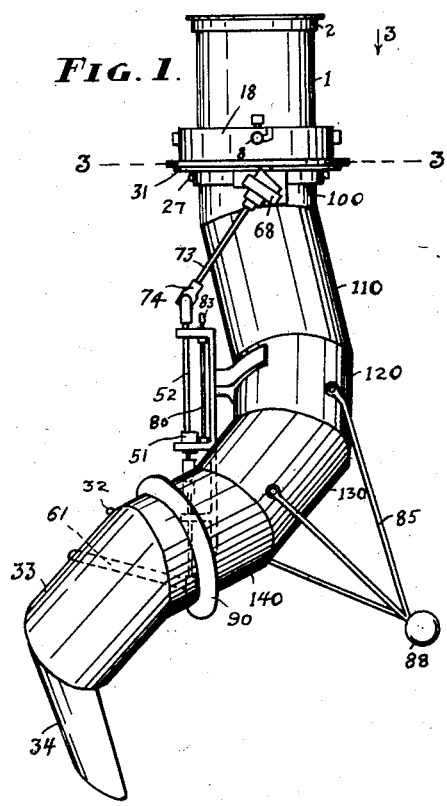
Figure 1 is a front elevational view of an ensilage distributor in which my invention is embodied.
Figure 2:
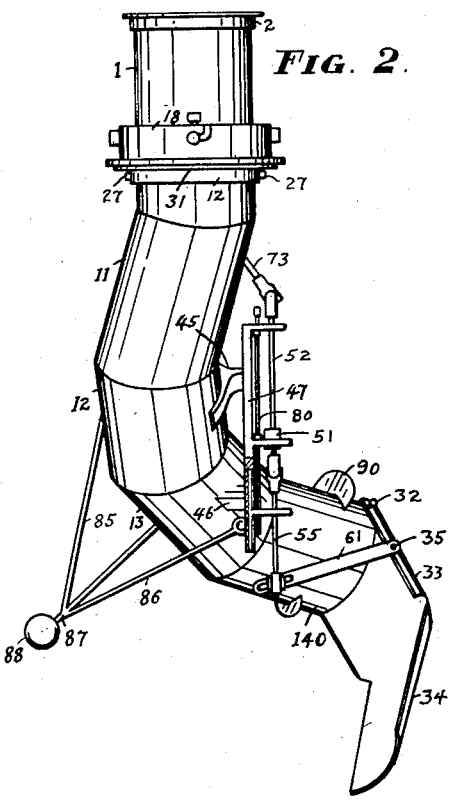
Figure 2 is a rear view of Figure 1.
Figure 3:
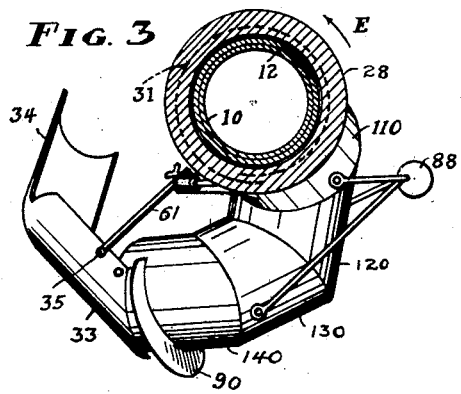
Figure 3 is a top plan view, as seen in the direction of arrow 3 in Figure 1.

To retain the said band 18 in associated relation with the top section 100 of the chute (for convenience in handling the latter when installing same, as will be hereinafter described), I provide spaced retainer cleats 27. At the lower portion of said band is an integral external flange 28. On the underside of this flange 28 is a spiral cam 31, shown by the broken lines in Figures 3 and 8, and whose ends 31a and 31b are in the positions related to each other as shown in Figures 3 and 8.

Hingedly retained on studs 32, and which is operable toward and also away from the mouth of section 140 of the chute, is a deflector. This deflector may be made of sheet metal, and it comprises a body section 33 and nose section 34 which are of curved formation in cross section. At the upper portion of the body section 33 of said deflector is a stud 35 which is adapted to receive the connections presently to be described.

A mechanism carried by the chute, to operate the deflector on its hinge connections 32, consists of the parts as follows. Fastened to the said chute by suitable brackets 45 and 46 is an upright frame member 47, having arms 48 and 49, and a vertical guideway 50. Journaled in the arm 49 is a drum 51. A vertical shaft 52 whose lower portion is secured eccentrically to said drum, is journaled at its upper portion in the bracket 48. In the said guideway 50 is slidingly retained a cross head 53 which has arm 54. A shaft 55 is retained loosely in a bore 56 in the said arm 54, and its upper end is articulated by a universal joint 57 to the lower end of shaft 52. The bottom of shaft 55 is provided with a swivel yoke 58 upon which is pivotally retained a crosshead 59. This crosshead is retained at desired position in a slot 60 of a link 61, by a fastener nut 62. The other end of the said link is pivotally connected to the deflector stud and nut 35. It is obvious that by rotating the shaft 52 there is a swinging movement of the lower end of shaft 55 and crosshead 59.

To so actuate the operating mechanism of said deflector, that from the moment of the start, until the moment of the completion of the outward swing of the deflector, its movement will be at a decelerating pace; and that from the moment of the start until the moment of the completion of the inward swing of the deflector, its movement will be at an accelerating pace, I have provided the combination and arrangement of parts as follows:

65 designates a crown gear wheel. This crown wheel 65 has a hub 66 whose center is eccentric to the center of said wheel, and it is journaled in a bracket 68 which is secured to the side of the top section 100 of the rotatable chute. A collar 69 which is fastened to said hub by a set screw 70 retains the said hub against longitudinal movement. In a bore 67 of said hub is fastened a head piece 71 which has a central bore. In the bore of said head piece 71, there is secured, by a cotter pin 72, a shaft 73. This shaft 73 is disposed at the suitable inclination shown, and its lower end is articulated with shaft 52 by a universal joint 74.

Preliminary to reference to the peculiar motion of, and to the peculiar function performed by said crown wheel, it is here pointed out that the distance (measured on the plane of cam 31) from the point C (the bisection of the center line of hub 66 extended and the cam 31) to the point D (the bisection of the cam 31 and the curved pitch line of wheel 65) increases during one half revolution of the crown wheel, and it then decreases during the following half revolution. The path of the pitch line of the teeth of this wheel is that of a line starting from the point D and inscribed on the wall of the wheel 65 during the travel of the latter on its eccentric, through one revolution, and is elliptical. The angle of inclination of the plane of the elliptical pitch line so formed is, in the present installation, that which is dictated by the angle of incline of the shaft 73. The minimum degree of the said angle of inclination of the plane of said elliptical pitch line is that which will permit of the teeth of the lower side of said wheel to clear the cam 31 as the said wheel proceeds in its rotative movement.

The relative dimensions of the said crown wheel 65, and the said drum 51, are such, and the said crown wheel 65 and said drum 51 are set in such positions in relation to each other, that when the deflector is in the inward or retracted position (as shown in the drawings) the uppermost tooth of the crown wheel 65 is in registration with the space 75 between the inner end 31a and the outer end 31b of the spiral cam 31, the said crown wheel being in mesh with the inner end of said cam. The major or horizontal axis (designated by the broken line M—M in Figure 9) of the drum 51 is at substantially a right angle to a radial line from point D to center of the chute; and the position of the shaft 52, when the crown wheel 65 is in the position above described, is perpendicular, as shown in the drawings. It will be understood that the band 18 upon the underside of whose flange is the integrally formed spiral cam 31, is stationary. Obviously, as the chute revolves, the distance from point D to the center of the hub 66, during one half revolution of the crown wheel 65, gradually increases, and coincidently therewith the speed of movement of the crown wheel diminishes, and during the next half revolution of the crown wheel the distance from point D to the center of the hub 66 gradually decreases, and coincidently therewith the speed of movement of the crown wheel increases. To this, further reference will presently be made.

A rod 80 which is journaled in the arm 48, and is retained by collars 81 and 82 against longitudinal movement, and which is provided with a knurled head 83, has its lower end in threaded engagement with the arm 54 of said cross head 53. By turning this rod 80 clockwise the cross head is raised. By turning the rod 80 anti-clockwise, the crosshead 53 is lowered. The cross head 53 acts as a movable fulcrum, and by the above arrangement for maintaining it at different heights, the length of the orbit described by the lower end of the shaft 55 may be varied.

A counterbalancing means, to stabilize the motion of the chute in its rotative travel, may consist of arms 85 and 86 diverging from a stem 87, and whose ends are secured to the body sections of the chute. On the said stem is a weight 88. The shape of said counterbalancing device, and its position is such as to be substantially opposite the deflector and the operating mechanism therefor.

Spaced a suitable distance from the end of the mouth section 140 of the chute is a curved apron plate 90 whose function is to shield the opening between the upper end of the deflector and the marginal edge of the mouth section against entry of fragments of fodder that incidentally drop from the open underside of the fixed conduit pipe C.

Installing the invention for use consists in first securing the support neck 1 by its flange 2 to the outlet section D of the said conduit pipe C. The chute, complete with its connected parts as shown in the drawings, is then lifted to place, the counterbore 19 of the band 18 coming into engagement with the face of the ring 3, and the slots 20 passing the studs 7. A slight move, circularly, of the band 18, causes the inclined portions of the slots 21 to engage the said studs 7, the band 18 being thereby joined to the support neck. When the moving of the said band will have been continued sufficiently to have established the proper relation between the balls 6 and the balls 13, with their respective raceways 14 and 13, the nuts 8 are tightened, and the said band is securely united with the ring 3 of the support neck.

At the same time, the tongue 5 will have assumed position in registration with groove 15, there being a space 91 between said tongue and groove. This space 91 which constitutes an annular channel acquires, and it retains a filling of grease, which constitutes a closure against entry into the anti-friction bearings of dust and particles of foreign matter from the interior of the neck and chute. By the construction and arrangement of parts above described, the chute is capable of free movement rotatively, and proper lubrication of the moving parts is assured. At the same time there is yieldability of the bearing to withstand severe strains imposed thereon, and also to negative all tendencies of the bearing to become jammed or overstrained.

The direction of travel of the chute structure is indicated by the arrow E in Figure 3, and also by arrow shown in Figure 8.

Assuming the chute to be in the position as illustrated in the drawings, the deflector 33 is in the inward or retracted position. The uppermost tooth of crown wheel 65 occupies the space between the ends 31a and 31b of the cam 31. In the present instance, the number of teeth on the crown wheel is twelve.

With the rotative movement of the chute, there is the actuation of the crown wheel 65 by the cam 31. With the gradual increase of the distance from the point D to the center of hub 66, the speed of movement of the crown wheel diminishes during the first one-half revolution thereof. With a gradual decrease of the distance from the point D to the center of said hub during the next one-half revolution, there is increase of the speed of movement of the said crown wheel, and so on. Coincident with each one-half revolution of the crown wheel 65, is a one-half revolution of the drum 51. During the first one-half revolution of the crown wheel, the deflector will therefore have been swung from the inward, to the extreme outward position, the nature of this movement being such, that from the moment of the start, until the moment of the completion of said outward swing of the deflector, its movement will have been at a decelerating pace. During the succeeding one-half revolution of the crown wheel, the deflector will have been swung from the outward, to the extreme inward position, its movement, from the moment of the start, until the moment of the completion of said inward swing, being at an accelerating pace. The effect of this moving to and fro of the deflector is to direct the flow of the fodder in a varied line of incline or slant whereby the spread extends uniformly over the area bounded by the walls of the silo. By manipulation of the head nut 83 of the adjusting rod 80 the length of the sweep from the outward limit to the inward limit of the deflector's movement, may be predeterminately adjusted, with regard to the diameter of the silo. Also it is practicable, by use of the adjusting feature, to continue the even spread, as the level of the surface of the fodder being deposited in the silo, rises. In the filling of a silo of the ordinary dimensions of twelve feet in width, and forty feet in height, two or three adjustments only, may be necessary. At the time of delivering the fodder at the lowermost level, adjustment is had for a deflector swing of minimum length. At the times of delivering of the fodder at a higher level, and at the uppermost level, the adjusting is such as to increase the length of the swing of the deflector. I find that with the parts above described so coordinated, that during six revolutions of the chute there is a one-half revolution of the crown wheel 65, and one swing of the deflector, the results obtained in handling fodder under usual conditions, is satisfactory. It will be understood that the speed of movement of the deflector may be more or less in degree, depending upon the diameter of the crown wheel 65. By providing the slot 60 in the bar 61, it is practicable to predetermine the initial position to which the deflector is adjusted. The deflector is so adjusted that when it is set at the inward position (the position shown in the drawings) the fodder is being directed to the center of the silo, at a plane which is at a predetermined distance below the said deflector.

Whereas, I have shown and described in the drawings and specifications what I have found practicable, as to form, combination and arrangement, as a mechanism for carrying my invention into effect, I do not limit myself to the particular details of construction shown, nor to their particular form and arrangement. Accordingly, I desire the claims to be construed in the broadest terms possible, consistent with the definition of the invention as set forth in the appended claims.

What I claim as my invention, is—

1. A device for obtaining accelerating and decelerating motion consisting of a carrier, a crown wheel the plane of whose curvilinear pitch line is inclined at an angle to the longitudinal axis of the wheel, the hub of said wheel being eccentric to the wheel center, and journaled on said carrier, a fixed member located adjacent to the carrier, a cam integrated with said fixed member and which is articulated with the said crown gear wheel and is positioned at such angle to the axis of said wheel hub, that with a movement of the carrier there is a rotative movement of the said crown gear.

2. Means for converting rotary motion of invariable speed into accelerating and decelerating motion, consisting of a spiral cam and an eccentric crown gear wheel meshing therewith, the plane of the cam being at an angle of inclination to the axis of the crown gear wheel, a fixed support member for the cam, a carrier member for and upon which the crown gear wheel is journaled, and the curvilinear line of the crown gear wheel being that defined by a point in the cam registered on the periphery of the wheel during the rotation thereof.

3. In a mechanism for obtaining accelerating and decelerating motion, a fixed member, a spiral cam secured on said fixed member, a carrier, an eccentric gear wheel journaled thereon and the path of whose curvilinear pitch line is defined by a point on said cam, registering on the periphery of the said gear wheel during the rotating thereof on its eccentric axis.

4. Means for converting rotary motion into motions accelerating and decelerating in pace, said means consisting of a spiral cam fixed in position, an eccentric crown gear wheel meshing with the said cam, the pitch line of the gear wheel being elliptical, the plane thereof being inclined to the plane of the cam, a carrier for the eccentric crown gear wheel and upon which the latter is mounted for rotative movement, whereby when the carrier member is rotated, there is an actuation of the crown gear wheel, the motion thereof during one half revolution being at an accelerating pace, and during the following one half revolution, being at a decelerating pace.

5. Means for converting rotary motion into motion which is accelerating and then decelerating in pace, said means consisting of a carrier member mounted for rotation, an eccentric crown gear carried by said carrier member the hub of said crown gear being journaled at an angle inclined from the longitudinal axis of the carrier member, the plane of the curvilinear pitch line of the crown gear being at an angle inclined from the longitudinal axis of the crown gear hub, and a fixed device with which the crown gear is in mesh, whereby with the rotative movement of the carrier member, there is the rotative movement of the crown gear, the distance between the fixed member and the hub center decreasing during one half revolution, and increasing during the other half revolution of the crown gear, the pace of the crown gear accelerating and then decelerating accordingly.

6. Means for converting rotary motion into motion which is accelerating and then decelerating in pace, said means consisting of a rotative carrier member, an eccentric crown gear carried by the carrier member, the hub of said crown gear being journaled at an angle to the longitudinal axis of the carrier member, the pitch line of the gear being elliptical, the plane thereof inclined to the longitudinal axis of the gear wheel hub and a power transmitting device with which the crown gear is in mesh, whereby with the fixed position of the carrier member there is the rotative movement of the crown gear, the distance between the fixed device and the hub center of the crown gear wheel, decreasing during one half revolution, and increasing during the other half revolution of the crown gear, the pace of the movement said crown gear accelerating and decelerating accordingly.

7. Mechanical means to obtain successive decelerating and accelerating movements, consisting of a spiral cam fixed in position, a rotatable support member mounted adjacent to said cam, a shaft carried by said support member and mounted for rotative movement, a gear wheel secured to said shaft and meshing with said cam, the center of said gear wheel being eccentric to that of the shaft, the said shaft being retained at an angle inclined to the plane of the spiral cam, and the plane of the pitch line of the teeth of the gear wheel being inclined from a right angle to the axis of said shaft.

8. A gearing for providing successive decelerating and accelerating movements, and which said gearing is adapted to be carried by a rotating cylindrical member, consisting of a fixed member mounted in axial alignment with the rotatable cylindrical member and having an annular flange, a spiral cam integrated with said flange, a shaft journaled on the rotatable member and which is aligned at an angle inclined from the longitudinal axis of the said rotatable member, a crown gear wheel secured to the shaft and meshing with the said cam, the center of the said gear wheel being eccentric to the center of the shaft, and the pitch line of the gear wheel being elliptical, the plane thereof being at an angle to the plane of the cam.

WILLIAM E. McINTIRE.